United States Patent
Wu et al.

(10) Patent No.: US 10,498,481 B2
(45) Date of Patent: Dec. 3, 2019

(54) BROADCAST CHANNEL ENHANCEMENT WITH POLAR CODE

(71) Applicant: MEDIATEK INC., Hsinchu (TW)

(72) Inventors: Wei-De Wu, Hsinchu (TW); Chia-Wei Tai, Hsinchu (TW); Tao Chen, Beijing (CN); Yen-Cheng Liu, Hsinchu (TW); Xiu-Sheng Li, Hsinchu (TW); Wei-Jen Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/863,978

(22) Filed: Jan. 8, 2018

(65) Prior Publication Data

US 2018/0198555 A1    Jul. 12, 2018

Related U.S. Application Data (60) Provisional application No. 62/443,851, filed on Jan. 9, 2017, provisional application No. 62/590,278, filed
(Continued)

(51) Int. Cl.
*H04L 1/00* (2006.01)
*H04L 29/08* (2006.01)

(52) U.S. Cl.
CPC .......... *H04L 1/0009* (2013.01); *H04L 1/0057* (2013.01); *H04L 1/0071* (2013.01); *H04L 69/323* (2013.01); *H04L 2001/0093* (2013.01)

(58) Field of Classification Search
CPC ... H04L 1/0009; H04L 1/0071; H04L 1/0042; H04L 1/1614; H04L 1/1678; H04L 69/323; H04L 9/0858; H04L 25/4925
See application file for complete search history.

(56) References Cited

U.S. PATENT DOCUMENTS

| 6,259,744 B1 | 7/2001 | Lee et al. ...................... 375/264 |
| 2003/0215000 A1 | 11/2003 | Hansen ......................... 375/130 |

(Continued)

FOREIGN PATENT DOCUMENTS

| CN | 103220001 A | 7/2013 |
| CN | 103281166 A | 9/2013 |

(Continued)

OTHER PUBLICATIONS

International Search Report and Written Opinion of International Search Authority for PCT/CN2018/071792 dated Apr. 4, 2018 (9 pages).

(Continued)

*Primary Examiner* — Warner Wong
(74) *Attorney, Agent, or Firm* — Imperium Patent Works; Zheng Jin (57) ABSTRACT

A method of new radio physical broadcast channel (NR-PBCH) bit mapping is proposed to improve for NR-PBCH decoding performance under Polar codes. NR-PBCH carries 32 information bits and 24 CRC bits. Specifically, NR-PBCH uses 512-bit Polar codes to carry total 56 data bits. Different Polar code bit channels have different channel reliability. As a general rule, the most reliable Polar code bit channels are used for the 56 data bits. In accordance with a novel aspect, within the 32 NR-PBCH information bits, some of the information bits that can be known to the decoders under certain conditions and therefore are placed at the least reliable Polar code bit positions. As a result, by mapping the NR-PBCH data bits properly at the input bit positions of Polar codes, the NR-PBCH decoding performance is improved when the known bits a priori can be exploited.

20 Claims, 5 Drawing Sheets

Related U.S. Application Data on Nov. 23, 2017, provisional application No. 62/592,389, filed on Nov. 29, 2017.

(56) References Cited

U.S. PATENT DOCUMENTS

| | | | |
|---|---|---|---|
| 2014/0365842 A1 | 12/2014 | Li et al. | 714/752 |
| 2015/0026543 A1 | 1/2015 | Li et al. | 714/776 |
| 2017/0155405 A1 | 6/2017 | Ge et al. | 714/776 |
| 2017/0288703 A1* | 10/2017 | Shen | H03M 13/15 |
| 2018/0034587 A1* | 2/2018 | Kim | H03M 5/12 |
| 2018/0076929 A1* | 3/2018 | Zhang | H03M 13/11 |
| 2018/0167946 A1* | 6/2018 | Si | H04L 1/0061 |
| 2018/0227076 A1* | 8/2018 | Koike-Akino | H03M 13/3753 |
| 2018/0331783 A1* | 11/2018 | Ahn | H04L 1/0058 |
| 2018/0331788 A1* | 11/2018 | Kim | H04L 1/1893 |
| 2018/0351579 A1* | 12/2018 | Hong | H03M 13/13 |
| 2018/0359714 A1* | 12/2018 | Sadiq | H04W 56/001 |
| 2018/0375612 A1* | 12/2018 | Sarkis | H04L 1/0058 |
| 2019/0021102 A1* | 1/2019 | Wang | H04W 72/0413 |
| 2019/0081646 A1* | 3/2019 | Bioglio | H03M 13/09 |
| 2019/0158222 A1* | 5/2019 | Kurmaev | H04L 1/0058 |
| 2019/0165813 A1* | 5/2019 | Liu | H03M 13/033 |
| 2019/0173491 A1* | 6/2019 | Zhang | H03M 13/2903 |
| 2019/0181980 A1* | 6/2019 | Lou | H04L 1/0058 |
| 2019/0199474 A1* | 6/2019 | Chen | H03M 13/13 |
| 2019/0215099 A1* | 7/2019 | Dai | H04L 1/0041 |
| 2019/0223184 A1* | 7/2019 | Sarkis | H04W 72/0466 |

FOREIGN PATENT DOCUMENTS

| | | | | |
|---|---|---|---|---|
| CN | 103368583 A | 10/2013 | | |
| CN | 104539393 A | 4/2015 | | |
| WO | WO2014110949 A1 | 7/2014 | | |
| WO | WO2018161762 | * 9/2018 | | H04B 10/516 |
| WO | WO2018170832 | * 9/2018 | | H04L 1/00 |
| WO | WO 2018184479 | * 11/2018 | | H04L 1/00 |
| WO | WO2018201409 | * 11/2018 | | H04L 1/00 |
| WO | WO2019095279 | * 2/2019 | | H04L 1/00 |

OTHER PUBLICATIONS

R1-1700169 3GPP TSG RAN WG1 AH_NR Meeting, MediaTek Inc., "PBCH Enhancement with Polar Code", Spokane, USA, Jan. 16-20, 2017.

R1-1700168 3GPP TSG RAN WG1 AH_NR Meeting, MediaTek Inc., "Polar Code Design Features for Control Channels", Spokane, USA, Jan. 16-20, 2017.

R1-167871 3GPP TSG WG1 Meeting #86, MediaTek Inc., Examination of NR Coding Candidates for Low-Rate Applications, Gothenburg, Sweden, Aug. 22-26, 2016.

R1-165165 3GPP TSG RAN WG1 Meeting #85bis, MediaTek Inc., "Discussion on Polar Code Design and Performance", Nanjing, China, May 23-27, 2016.

R1-164039 3GPP TSG RAN WG1 Meeting #xx, Huawei et al., "Polar codes—encoding and decoding", Nanjing, China, May 23-27, 2016.

SIPO, office action for the CN patent application 201880000418.9 (no English translation is available) dated Apr. 11, 2019 (5 pages).

Taiwan IPO, office action for the TW patent application 107100851 (no English translation is available) dated Apr. 12, 2019 (3 pages).

* cited by examiner

| 247 | 0 | c0 |
|---|---|---|
| 253 | 2 | b |
| 254 | 3 | b |
| 255 | 5 | b |
| 367 | 7 | s |
| 375 | 10 | s |
| 379 | 11 | other |
| 381 | 12 | other |
| 382 | 14 | other |
| 383 | 15 | other |
| 415 | 18 | s |
| 431 | 19 | other |
| 439 | 21 | other |
| 441 | 24 | s |
| 443 | 26 | other |
| 444 | 30 | s |

| 445 | 31 | other |
|---|---|---|
| 447 | 1 | other |
| 463 | 4 | other |
| 469 | 6 | s |
| 470 | 8 | s |
| 471 | 13 | other |
| 473 | 16 | s |
| 474 | 20 | other |
| 475 | 22 | other |
| 476 | 25 | other |
| 477 | 27 | other |
| 479 | 9 | other |
| 483 | 17 | s |
| 485 | 23 | s |
| 486 | 28 | other |
| 489 | 29 | other |

| 446 | CRC0 |
|---|---|
| 478 | CRC1 |
| 487 | CRC2 |
| 490 | CRC3 |
| 491 | CRC4 |
| 492 | CRC5 |
| 493 | CRC6 |
| 494 | CRC7 |
| 495 | CRC8 |
| 497 | CRC9 |
| 498 | CRC10 |
| 499 | CRC11 |

| 500 | CRC12 |
|---|---|
| 501 | CRC13 |
| 502 | CRC14 |
| 503 | CRC15 |
| 504 | CRC16 |
| 505 | CRC17 |
| 506 | CRC18 |
| 507 | CRC19 |
| 508 | CRC20 |
| 509 | CRC21 |
| 510 | CRC22 |
| 511 | CRC23 |

BROADCAST CHANNEL ENHANCEMENT WITH POLAR CODE

CROSS REFERENCE TO RELATED APPLICATIONS

This application claims priority under 35 U.S.C. § 119 from U.S. Provisional Application No. 62/443,851 entitled "Broadcasting Channel Enhancement with Polar Code," filed on Jan. 9, 2017; U.S. Provisional Application No. 62/590,278, entitled "NR PBCH Bit Position Design," filed on Nov. 23, 2017; U.S. Provisional Application No. 62/592,389 entitled "PBCH Bit Mapping Design Before First PBCH Scrambling," filed on Nov. 29, 2017, the subject matter of each of the foregoing documents is incorporated herein by reference.

TECHNICAL FIELD

The disclosed embodiments relate to broadcast channel design, and more specifically, to Physical Broadcast Channel (PBCH) design with Polar Code in next generation 5G new radio (NR) mobile communication networks.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred as user equipments (UEs). Enhancements to LTE systems are considered so that they can meet or exceed International Mobile Telecommunications Advanced (IMT-Advanced) fourth generation (4G) standard. In LTE networks, Physical Broadcast Channel (PBCH) is used for broadcasting information to different UEs.

The signal bandwidth for next generation 5G new radio (NR) systems is estimated to increase to up to hundreds of MHz for below 6 GHz bands and even to values of GHz in case of millimeter wave bands. Furthermore, the NR peak rate requirement can be up to 20 Gbps, which is more than ten times of LTE. Three main applications in 5G NR system include enhanced Mobile Broadband (eMBB), Ultra-Reliable Low Latency Communications (URLLC), and massive Machine-Type Communication (MTC) under milli-meter wave technology, small cell access, and unlicensed spectrum transmission. Multiplexing of eMBB & URLLC within a carrier is also supported.

Polar coding is adopted for NR-PBCH transmission. NR-PBCH carries the master control information (e.g., similar to MIB in LTE), which includes system bandwidth, Hybrid Automatic Repeat Request (HARQ) info, system frame number (SFN), timing information, etc. with CRC attachment. Specifically, NR-PBCH uses 512-bit Polar code to carry total 56 data bits. However, different Polar code bit channels have different channel reliability. An NR-PBCH bit mapping design is sought to enhance NR-PBCH decoding performance.

SUMMARY

A method of new radio physical broadcast channel (NR-PBCH) bit mapping is proposed to improve for NR-PBCH decoding performance under Polar codes. Polar coding is adopted for NR-PBCH transmission. NR-PBCH carries 32 information bits, which includes system bandwidth, Hybrid Automatic Repeat Request (HARQ) information, system frame number (SFN), timing information, etc. with 24 bits of Cyclic Redundancy Check (CRC) attachment. Specifically, NR-PBCH uses 512-bit Polar codes to carry total 56 data bits. Different Polar code bit channels have different channel reliability. As a general rule, the most reliable Polar code bit channels are used for the 56 data bits. In accordance with a novel aspect, within the 32 NR-PBCH information bits, some of the information bits can be known to the decoders under certain conditions and therefore are placed at the least reliable Polar code bit positions. As a result, by mapping the NR-PBCH data bits properly at the input bit positions of Polar codes, the NR-PBCH decoding performance is improved when the known bits a priori can be exploited.

In one embodiment, a transmitter generates a plurality of information bits in a mobile communication network. The plurality of information bits contains a set of timing-related bits known to a plurality of receivers under one or more conditions. The transmitter performs a bit mapping for the plurality of information bits such that the set of timing-related bits having a predefined order. The transmitter encodes the plurality of information bits using a Polar encoder. The set of timing-related bits is placed at substantially the most unreliable input bit positions of the Polar encoder as a result of the bit mapping. The transmitter broadcasts the encoded bits over an allocated physical broadcast channel (PBCH).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
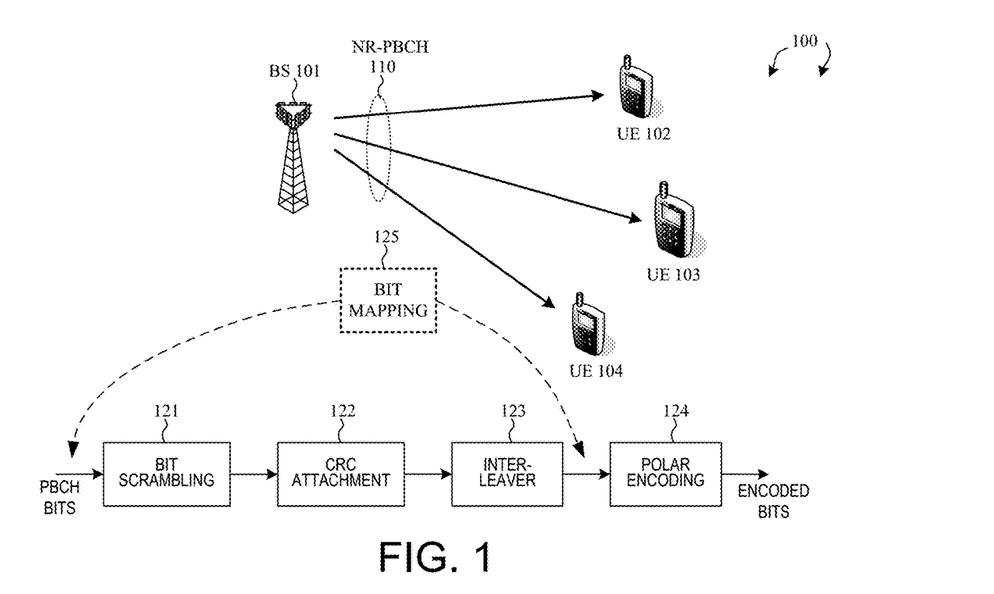
FIG. 1 illustrates a next generation new radio (NR) mobile communication network with enhanced physical broadcast channel (NR-PBCH) design in accordance with one novel aspect.

FIG. 1 illustrates a next generation new radio (NR) mobile communication network with enhanced physical broadcast channel (PBCH) design in accordance with one novel aspect. Mobile communication network 100 is an OFDM/OFDMA system comprising a base station BS 101 and a plurality of user equipment UE 102, UE 103, and UE 104. When there is a downlink packet to be sent from the BS to the UE, each UE gets a downlink assignment, e.g., a set of radio resources in a physical downlink shared channel (PDSCH). When a UE needs to send a packet to the BS in the uplink, the UE gets a grant from the BS that assigns a physical uplink shared channel (PUSCH) consisting of a set of uplink radio resources. The UE gets the downlink or uplink scheduling information from an NR-PDCCH that is targeted specifically to that UE. In addition, broadcast control information is also sent in the NR-PDCCH to all UEs in a cell. The downlink and uplink scheduling information and the broadcast control information, carried by the NR-PDCCH, together is referred to as downlink control information (DCI).

Furthermore, an NR Physical Broadcast Channel (NR-PBCH) is used to broadcast Master Information Block (MIB) to the UEs. MIB is a very important message or information broadcasted by the serving base station irrespective of any UE presence. The MIB is first among other System Information Blocks (SIBs), which are also broadcasted by the serving base station. The MIB is a 32-bit data block carrying the following information: 3 bits for system bandwidth, 3 bits for Physical Hybrid-ARQ Indicator Channel (PHICH) information, 10 bits for System Frame Number (SFN), 6 bits for Synchronization Signal Block Time Index (SSBI), one half radio frame bit, and other bits reserved for future use. The MIB payload is received from higher layer to physical layer and the physical layer will follow the following processes: CRC generation (24-bit CRC) and attachment to the MIB, Polar encoding, rate matching, scrambling, interleaving, modulation, etc., and finally is broadcasted over the radio resource allocated for the physical layer NR-PBCH.

In 3GPP LTE system based on OFDMA downlink, the radio resource is partitioned into radio frames and subframes, each subframe is comprised of two slots and each slot has seven OFDMA symbols along time domain. Each OFDMA symbol further consists of a number of OFDMA subcarriers along frequency domain depending on the system bandwidth. The basic unit of the resource grid is called Resource Element (RE), which spans an OFDMA subcarrier over one OFDMA symbol. Comparing to LTE numerology (subcarrier spacing and symbol length), in next generation 5G NR systems, multiple numerologies are supported and the radio frame structure gets a little bit different depending on the type of numerology. However, regardless of numerology, the length of one radio frame is always 10 ms, and the length of a subframe/slot is always 1 ms. The transmission periodicity of PBCH is the duration between two consecutive PBCH transmission by the physical layer. The physical layer transmits the PBCH for every 10 ms on subframe/slot 0 of all radio frames. Although, the contents within 4 consecutive PBCH remain the same as the PBCH carriers the MIB, which can only change after 40 ms from the first PBCH transmission.

In the example of FIG. 1, NR-PBCH 110 is used for BS 101 to broadcast the MIB to the UEs. Specifically, NR-PBCH uses 512-bit Polar code to carry total 56 data bits. In step 121, bit scrambling is performed on the NR-PBCH information bits (32 bits). In step 122, a 24-bit CRC is generated and attached to the NR-PBCH information bits. In step 123, bit interleaving is performed on the total 56 data bits of the NR-PBCH with CRC. In step 124, Polar encoding is applied. However, different Polar code bit channels have different channel reliability. As a general rule, the most reliable Polar code bit channels are used for the 56 data bits. In accordance with a novel aspect, within the 32 NR-PBCH information bits, some of the information bits are known to the decoders of the receiving UEs and therefore are placed at the least reliable Polar code bit positions. As a result, by mapping the NR-PBCH data bits properly at the input bit positions of Polar encoding, the NR-PBCH decoding performance is improved. Note that the NR-PBCH bit mapping at step 125 can be done either before the Polar encoding at step 124 or before the bit scrambling at step 121 to achieve the same NR-PBCH decoding performance gain.

Figure 2:
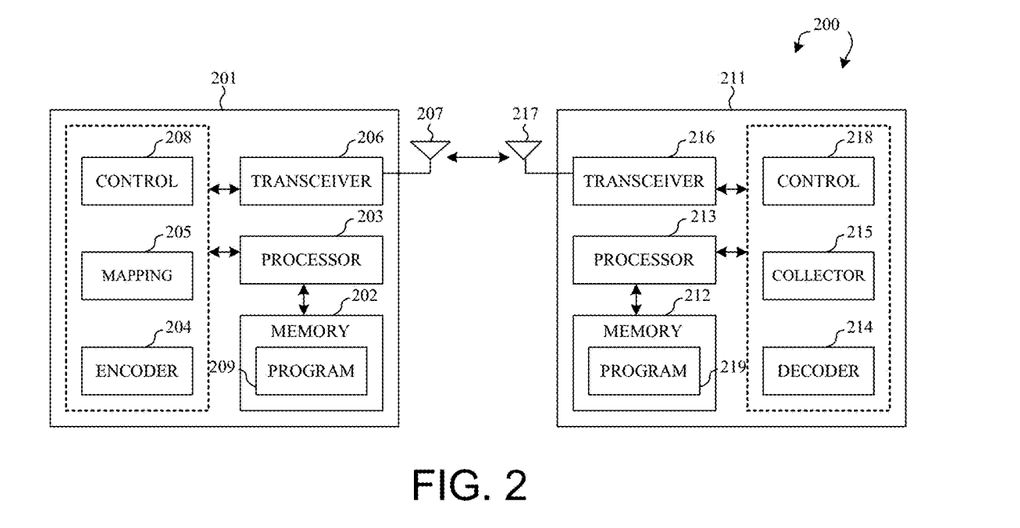
FIG. 2 illustrates simplified block diagrams of a base station and a user equipment in accordance with embodiments of the present invention.

FIG. 2 illustrates simplified block diagrams of a base station 201 and a user equipment 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in base station 201. Memory 202 stores program instructions and data 209 to control the operations of the base station.

Similar configuration exists in UE 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in UE 211. Memory 212 stores program instructions and data 219 to control the operations of the UE.

The base station 201 and UE 211 also include several functional modules and circuits to carry out some embodiments of the present invention. The different functional modules and circuits can be implemented by software, firmware, hardware, or any combination thereof. In one example, each function module or circuit comprises a processor together with corresponding program codes. The function modules and circuits, when executed by the processors 203 and 213 (e.g., via executing program codes 209 and 219), for example, allow base station 201 to encode and transmit MIB and other control information to UE 211, and allow UE 211 to receive and decode the MIB and other control information accordingly.

In one embodiment, base station 201 allocates a set of radio resource for NR-PBCH transmission via control circuit 208 and maps the MIB information to the allocated REs via mapping module 205. The MIB information carried in NR-PBCH is then modulated and encoded via encoder 204 to be transmitted by transceiver 206 via antenna 207. UE 211 receives the MIB information by transceiver 216 via antenna 217. UE 211 determines the allocated radio resource for NR-PBCH transmission via control circuit 218 and collects the allocated REs via collector 215. UE 211 then demodulates and decodes the MIB information from the collected REs via decoder 214. In one example, encoder 204 applies Polar encoding and performs NR-PBCH bit mapping before the Polar encoding to improve the decoding performance of the NR-PBCH.

In information theory, a polar code is a linear block error correcting code. The code construction is based on a multiple recursive concatenation of a short kernel code which transforms the physical channel into virtual outer channels. When the number of recursions becomes large, the virtual channels tend to either have high reliability or low reliability, and the data bits are allocated to the most reliable channels. For 5G NR system, Polar code is adopted in 5G NR system for broadcast channels and control channels due to the improvements of Polar performance.

Figure 3:
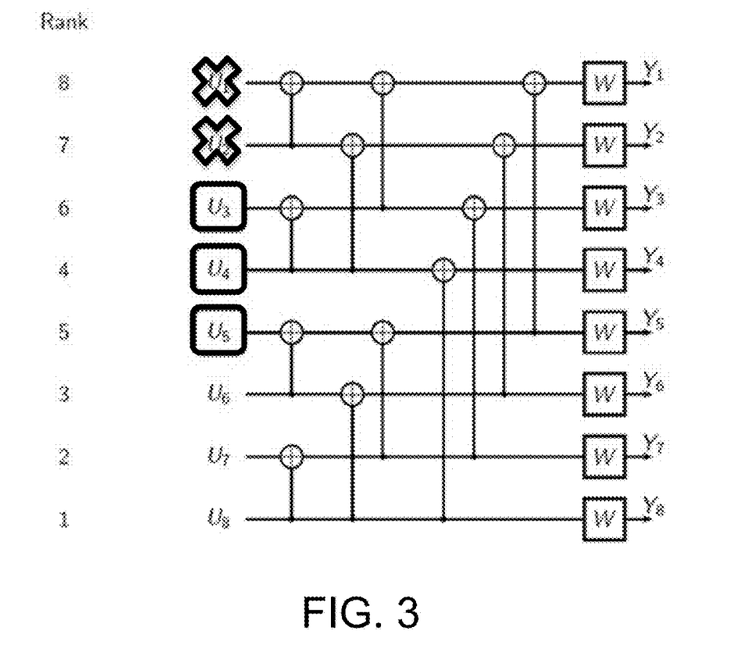
FIG. 3 illustrates an example of Polar encoding to be used for NR-PBCH information bits in accordance with one novel aspect.

FIG. 3 illustrates an example of Polar encoding to be used for NR-PBCH information bits in accordance with one novel aspect. Based on the design of Polar codes, each Polar code bit channels have different qualities, and they can be represented by an order list. For transmitting K data bits, the first K best non-punctured bit channels are selected from the list to load the data bits. If K'<K bits are to be transmitted, then K' selected bit indices will be a subset of the K bit indices and corresponds to the better K' bit channels out of the total K best bit channels. Assume there may be L known bits available, then the K'=K-L so that the L known bits can be assigned to the L worst bit channels out of the total K best bit channels. In case the L bits are known, Polar decoding can set the L bit channels as frozen bits so that the code become a lower rate code transmitting only K' data bits. The code rate difference will therefore contribute to performance gain in decoding the PBCH with known bits.

FIG. 3 depicts an 8-bit Polar encoder. The input bits are $U_1$, $U_2$, $U_3$, $U_4$, $U_5$, $U_6$, $U_7$, and $U_8$, the output bits are $Y_1$, $Y_2$, $Y_3$, $Y_4$, $Y_5$, $Y_6$, $Y_7$, and $Y_8$, and W is the wireless channel. Each input bit has an index associated with its bit position, and each input bit is associated with a corresponding bit channel reliability. The bit channel reliability is ranked as 1 being the best and larger being less reliable, that is, the bit channel quality order list={8 7 6 5 4 3 2 1} for $U_1$ to $U_8$ with ascending reliability. In the example of FIG. 3, for the 8-bit channels, K=6 and L=3. As a result, the best K bit channels are $U_3$-$U_8$. Out of the best K bit channels, unknown data bits are assigned to the best reliable bit positions: $U_8$, $U_7$, and $U_6$. Possible known bits are assigned to the least reliable bit positions: $U_5$, $U_4$, and $U_3$. Unused bits are set to known zero (Frozen): $U_2$ and $U_1$. By assigning unknown data bits in the best reliable bit positions, decoding error rate can be reduced when the other data bits are known. Such bit-mapping design for Polar codes can then be applied for NR-PBCH encoding, where certain NR-PBCH information bits are possibly known by the decoders.

Figure 4:
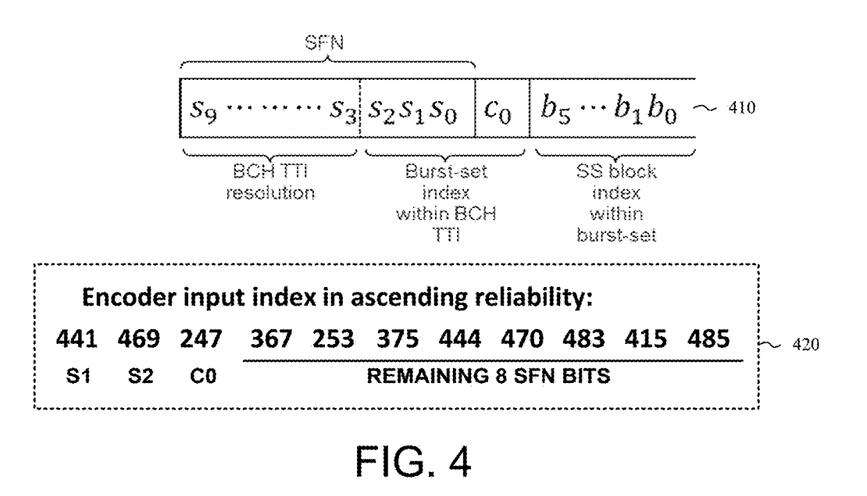
FIG. 4 illustrates a first embodiment of NR-PBCH bit mapping for Polar encoding in accordance with embodiments of the present invention.

FIG. 4 illustrates a first embodiment of NR-PBCH bit mapping for Polar encoding in accordance with embodiments of the present invention. As described earlier, the MIB carried by NR-PBCH is a total of 56 bits data with 32 information bits and 24 CRC bits. The 32 information bits include the following information: 3 bits for system bandwidth, 3 bits for Physical Hybrid-ARQ Indicator Channel (PHICH) information, 10 bits for system frame number (SFN), 6 bits for SS block time index (SSBI), one half radio frame (c0) bit, and other bits reserved for future use. As depicted by 410 of FIG. 4, the NR-PBCH information bits include the following timing-related information bits: 10 bits of SFN (s9 to s0), one bit of c0, and 3 bits of SSBI (b5-b3).

In one novel aspect, considering whether one or more PBCH fields may have known bit values in certain scenarios, the PBCH bits can be placed in a predefined order for Polar encoding to enable potential improved PBCH decoder performance, with the CRC being calculated based on the order of the payload after this ordering. It has been observed that under certain scenarios, some of the PBCH information bits may be known to the decoder. For example, SFN S2 and S1 bits are known under cross-burst-set combining of a given SFN hypothesis; the SFN bits and c0 can be known for synchronous networks; and SFN is known a priori for handover cases, etc. It is thus proposed that the ten SFN bits s9 to s0 plus one c0 bit should be placed to unreliable bit positions at the Polar encoder input for optimizing the performance gain with known values. In one specific example, for a 512-bit Polar encoder, K=56 and L=11. The 11 known bits (SFN and c0) are placed with the Polar encoder bit indices correspond to the least reliable bit channels in ascending reliability as depicted by box 420 of FIG. 4. Simulation result shows that such NR-PBCH bit mapping can provide ~1 dB performance gain for MIB decoding at the receiver UE.

Figure 5:
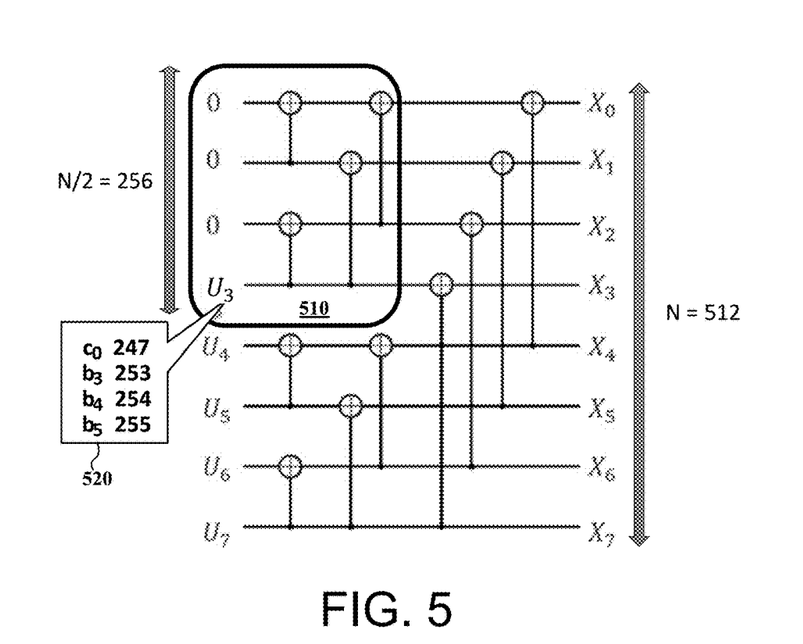
FIG. 5 illustrates a second embodiment NR-PBCH bit mapping for Polar encoding in accordance with embodiments of the present invention.

FIG. 5 illustrates a second embodiment of NR-PBCH bit mapping for Polar encoding in accordance with embodiments of the present invention. The SSBI (SS block timing index) bits can be known under intra-burst-set combining of a given SSBI hypothesis. For measurement and mobility management, UE requires up to three SSBI bits for PBCH. SSBI bits and c0 skip first PBCH scrambling and can be combined across burst sets without SFN hypothesis. In one novel aspect, it is proposed that three of the SSBI bits b3, b4, b5, and the one c0 bit can be placed to the front positions with the smallest bit indices at the Polar encoder input, which allows the receiver UE to perform efficient extraction and cross-burst-set combining for the SSBI bits and c0 bit.

As illustrated in FIG. 5, for the upper half size N/2=256 Polar subcode, as depicted by box 510, the Polar subcode output is independent from all other input data bits. As a result, by placing the half radio frame bit c0 and the three SSBI bits (b3, b4, b5) to the input bit positions of the upper Polar subcode, it allows the receiver to independently extract those bits without decoding the whole size N=512 Polar code. As depicted by arrow 520, the half radio frame bit c0, and the three SSBI bits b3, b4, and b5 are assigned to the four input bit indices with the smallest indices 247, 253, 254, and 255, to achieve the decoding latency or complexity reduction of the receiver.

Figure 6:
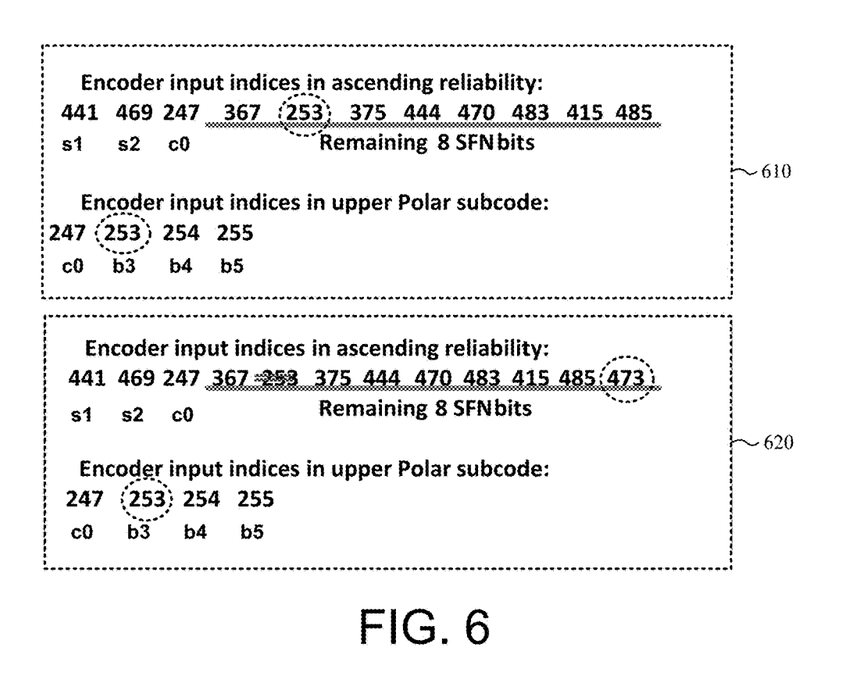
FIG. 6 illustrates a third embodiment of NR-PBCH bit mapping for Polar encoding in accordance with embodiments of the present invention.

FIG. 6 illustrates a third embodiment of NR-PBCH bit mapping for Polar encoding in accordance with embodiments of the present invention. As depicted by box 610 of FIG. 6, based on the first embodiment of NR-PBCH bit mapping illustrated in FIG. 4, the SFN bits and the c0 bit are placed at the Polar encoder input with bit indices correspond to the least reliable bit channels in ascending reliability. For example, encoder input indices 441, 469, 247, 367, 253, 375, 444, 470, 483, 415, and 485 are selected for s1, s2, c0, and the remaining SFN bits, respectively. Meanwhile, based on the second embodiment of NR-PBCH bit mapping as illustrated in FIG. 5, the SSBI bits and the c0 bit are placed at the Polar encoder input with bit indices in the upper Polar subcode having the smallest index values. For example, encoder input indices 247, 253, 254, and 255 are selected for bits c0, b3, b4, and b5, respectively. The first embodiment is to optimize decoding performance with known values while the second embodiment is to reduce decoding latency or complexity and to have potential performance gain.

However, the two NR-PBCH bit mapping design options create a conflict. Under the first embodiment, the input bit index 253 is used for one of the SFN bit. Under the second the embodiment, the same input bit index 253 is used for one of the SSBI bit. To resolve such conflict, it is proposed that input index 253 is reserved for one of the SSBI bit (e.g., bit b3) based on the second embodiment, while all other available input bit indices in ascending reliability are used for SFN and c0 bits under the first embodiment. As depicted by box 620 of FIG. 6, encoder input bit indices 441, 469, 247, 367, 375, 444, 470, 483, 415, 485, and 473 are selected for s1, s2, c0, and remaining SFN bits, respectively. Specifically, input bit index 473 having the next worst channel reliability is used to replace input bit index 253. Therefore, the 11 known bits of PBCH is still mapped to substantially the most unreliable bit channels (e.g., by using the next one or two worst bit channels) of the Polar encoder. Simulation result shows that such PBCH bit mapping has virtually the same decoding performance.

Figure 7:
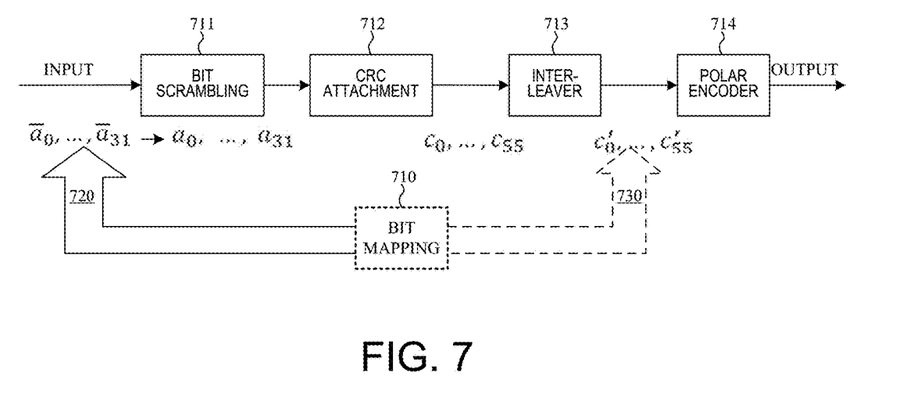
FIG. 7 illustrates a simplified block diagram of an NR-PBCH bit mapping and encoding process in accordance with embodiments of the present invention.

FIG. 7 illustrates a simplified block diagram of an NR-PBCH bit mapping and encoding process in accordance with embodiments of the present invention. In the example of FIG. 7, NR-PBCH uses a 512-bit Polar encoder to encode a total of 56 PBCH data bits, including 32 information bits and 24 CRC bits. In step 711, bit scrambling is performed on the PBCH information bits $\bar{a}_0, \ldots, \bar{a}_{31}$ (32 bits). In step 712, a 24-bit CRC is generated and attached to the PBCH information bits, outputting the PBCH data bits $c_0, \ldots, c_{55}$ (56 bits). In step 713, bit interleaving is performed on the total 56 PHCH data bits with CRC, and outputting the interleaved PBCH data bits $c'_0, \ldots c'_{55}$ (56 bits). In step 124, Polar encoding is applied to the interleaved PBCH data bits for PBCH transmission.

As illustrated earlier, to improve PBCH decoding performance and to reduce PBCH decoding latency/complexity, PBCH bit mapping is performed before Polar encoding such that certain timing-related PBCH data bits before the Polar encoder is placed in certain order, as depicted by arrow 730. However, sometimes it is desirable to apply the PBCH bit mapping function before the bit scrambling, CRC encoding, and interleaving. This way, the PBCH bit mapping is not affected by the bit scrambling and the same design for the bit scrambling, CRC encoding, interleaving, and Polar encoding can be shared for different control channels including PBCH, PDCCH, etc. In accordance with a novel aspect, a PBCH bit mapping function (710) is applied to the PBCH information bits before the PBCH bit scrambling. As depicted by arrow 720, the PBCH information bits $\bar{a}_0, \ldots, \bar{a}_{31}$ is mapped to information bits $a_0, \ldots, a_{31}$.

The following Table 1-1, shows one example of mapping the PBCH information bits $\bar{a}_0, \ldots, \bar{a}_{31}$ to information bits $a_0, \ldots, a_{31}$, by mapping index j of $\bar{a}_0, \ldots, \bar{a}_{31}$ to index G(j) of $a_0, \ldots, a_{31}$. Based on Table 1-1, the set of encoder input positions for SFN bits (s0-s9) correspond to the information bit position set A={24, 6, 7, 10, 30, 8, 17, 18, 23, 16}, the encoder input position for half radio frame bit c0 corresponds to information bit position B={0}, and the encoder input positions for the three SSBI bits (b3, b4, b5) correspond to information bit position set C={2, 3, 5}. Note that each individual bit position with the position set may be interchangeable. In one specific example, the timing related bits ($s_9, s_8, s_7, s_6, s_5, s_4, s_3, s_2, s_1, s_0, c_0, b_5, b_4, b_3$) are mapped to ($a_{16}, a_{23}, a_{17}, a_8, a_{30}, a_{10}, a_6, a_{24}, a_7, a_0, a_5, a_3, a_2$), respectively. The remaining info bits are mapped to ($a_1, a_4, a_9, a_{11}, a_{12}, a_{13}, a_{14}, a_{15}, a_{19}, a_{20}, a_{21}, a_{22}, a_{25}, a_{26}, a_{27}, a_{28}, a_{29}, a_{31}$).

TABLE 1-1

| j | G(j) |
|---|------|
| 0 | 16 |
| 1 | 23 |
| 2 | 18 |
| 3 | 17 |
| 4 | 8 |
| 5 | 30 |
| 6 | 10 |
| 7 | 6 |
| 8 | 24 |
| 9 | 7 |
| 10 | 0 |
| 11 | 5 |
| 12 | 3 |
| 13 | 2 |
| 14 | 1 |
| 15 | 4 |
| 16 | 9 |
| 17 | 11 |
| 18 | 12 |
| 19 | 13 |
| 20 | 14 |
| 21 | 15 |
| 22 | 19 |
| 23 | 20 |
| 24 | 21 |
| 25 | 22 |
| 26 | 25 |
| 27 | 26 |
| 28 | 27 |
| 29 | 28 |
| 30 | 29 |
| 31 | 31 |

Although the PBCH bit mapping can occur at different locations, such mapping has the equivalent effect as long as the timing-related PBCH data bits before the Polar encoder input are placed with the same order. That is, among the resulting $c_0', \ldots, c_{55}'$ (56 bits) for the Polar encoder input, the 11 known bits are placed at substantially the least reliable Polar code bit positions. In addition, the three SSBI and one c0 bits are placed at the front Polar code bit positions.

Figure 8:
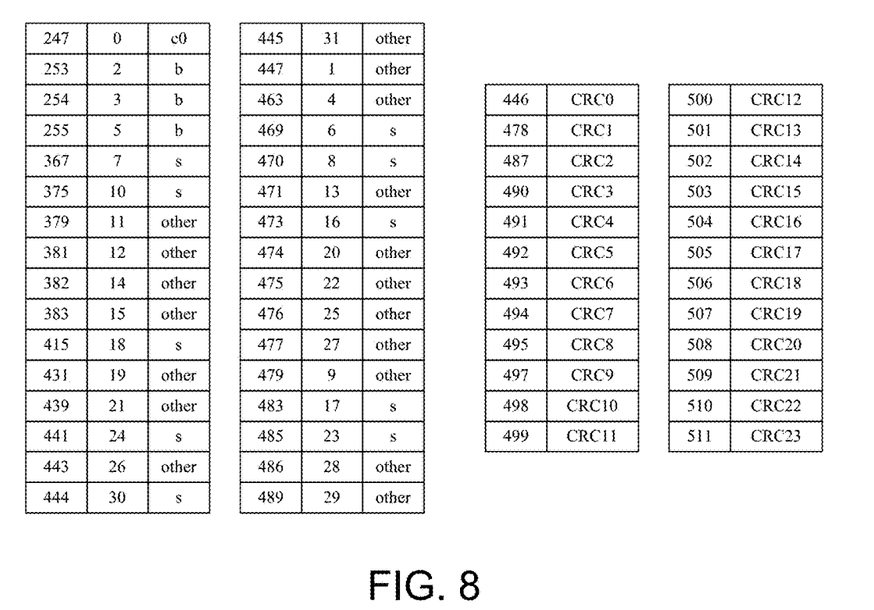
FIG. 8 illustrates an example of NR-PBCH bit mapping by placing timing related bits in a specific order before NR-PBCH bit scrambling.

FIG. 8 illustrates an example of NR-PBCH bit mapping by placing timing related bits in a specific order before NR-PBCH bit scrambling. In the example of FIG. 8, all the 56 PBCH data bits (0-31 information bits and the 24 CRC bits (CRC0-CRC23)) are mapped to a corresponding Polar code bit position with an index based on the previously illustrated bit-mapping, while the remaining unlisted Polar code indices are set to be frozen bits. More specifically, the 10 SFN bits are mapped to PBCH information bit positions of {24, 6, 7, 10, 30, 8, 17, 18, 23, 16}, which are corresponding to Polar code input positions having indices 441, 469, 367, 375, 444, 470, 483, 415, 485, and 473 with ascending reliability. The half radio frame bit c0 and the three SSBI bits are mapped to PBCH information bit positions of {0, 2, 3, 5}, which are corresponding to Polar code input positions having the smallest indices 247, 253, 254, and 255.

Figure 9:
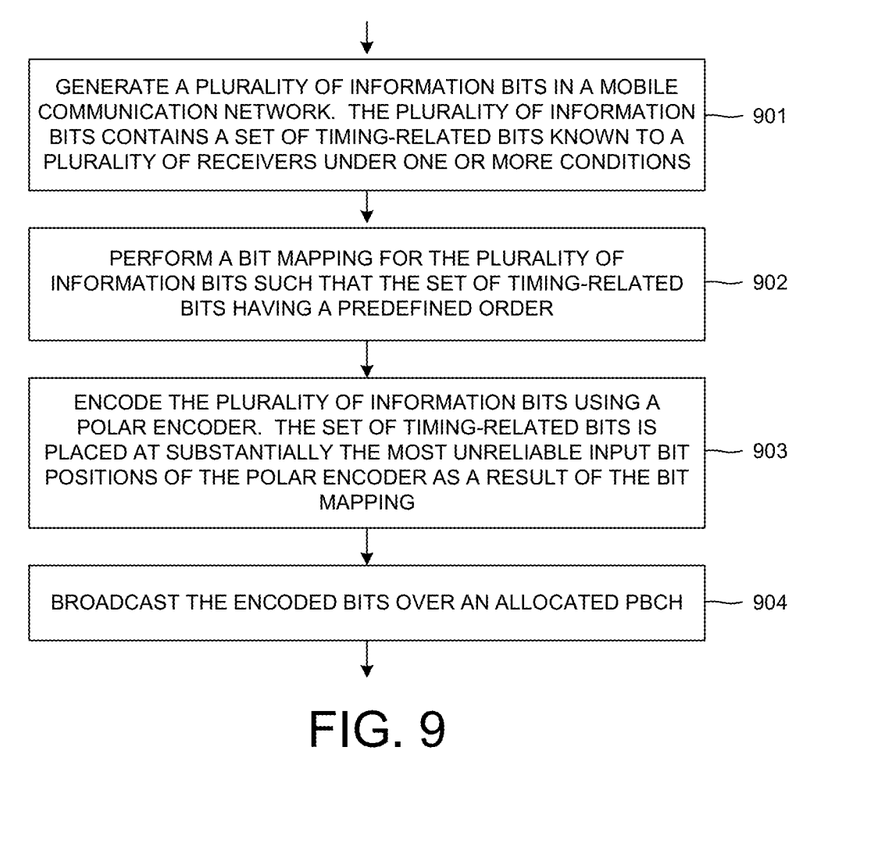
FIG. 9 is a flow chart of a method of enhanced NR-PBCH bit mapping with Polar encoding in accordance with one novel aspect.

FIG. 9 is a flow chart of a method of enhanced NR-PBCH bit mapping with Polar encoding in accordance with one novel aspect. In step 901, a transmitter generates a plurality of information bits in a mobile communication network. The plurality of information bits contains a set of timing-related bits known to a plurality of receivers under one or more conditions. In step 902, the transmitter performs a bit mapping for the plurality of information bits such that the set of timing-related bits having a predefined order. In step 903, the transmitter encodes the plurality of information bits using a Polar encoder. The set of timing-related bits is placed at substantially the most unreliable input bit positions of the Polar encoder as a result of the bit mapping. In step 904, the transmitter broadcasts the encoded bits over an allocated physical broadcast channel (PBCH).

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
generating a plurality of information bits by a transmitter in a mobile communication network, wherein the plurality of information bits contains a set of timing-related bits known to a plurality of receivers under one or more conditions;
performing a bit mapping for the plurality of information bits such that the set of timing-related bits having a predefined order;
encoding the plurality of information bits using a Polar encoder, wherein the set of timing-related bits is placed at substantially the most unreliable input bit positions among all payload bits of the Polar encoder as a result of the bit mapping; and
broadcasting the encoded bits over an allocated physical broadcast channel (PBCH).

2. The method of claim 1, wherein the Polar encoder receives a plurality of input bits, wherein each input bit position has an index associated with a channel reliability.

3. The method of claim 1, wherein the set of timing-related bits comprises ten system frame number (SFN) bits and a half radio frame bit that are known to the plurality of receivers under the one or more conditions.

4. The method of claim 3, wherein the set of timing-related bits is mapped to Polar encoder input bit positions having indices 441, 469, 247, 367, 375, 444, 470, 483, 415, 485, and 473 with ascending reliability.

5. The method of claim 3, wherein the transmitter also performs a bit scrambling, a cyclic redundancy check (CRC) attachment, and an interleaving on the plurality of information bits.

6. The method of claim 5, wherein the bit mapping is performed before the bit scrambling on the plurality of information bits.

7. The method of claim 6, where the set of timing-related bits is mapped to the plurality of information bits having the predefined order from position set {16, 23, 18, 17, 8, 30, 10, 6, 24, 7, 0}.

8. The method of claim 1, wherein the plurality of information bits comprises a second set of timing-related bits including a half radio frame bit and three synchronization signal block time index (SSBI) bits.

9. The method of claim 8, wherein the second set of timing-related bits is placed at the Polar encoder input bit positions with the smallest utilized index values having indices 247, 253, 254, and 255.

10. The method of claim 8, wherein a second set of timing-related bits is mapped to the plurality of information bits having positions of {0, 2, 3, 5} before a bit scrambling operation.

11. A transmitting device, comprising:
a control circuit that generates a plurality of information bits in a mobile communication network, wherein the plurality of information bits contains a set of timing-related bits known to a plurality of receivers under one or more conditions;
a bit mapper that performs bit mapping for the plurality of information bits such that the set of timing-related bits having a predefined order;
a Polar encoder that encodes the plurality of information bits, wherein the set of timing-related bits is placed at substantially the most unreliable input bit positions among all payload bits of the Polar encoder as a result of the bit mapping; and
a radio frequency (RF) transmitter that broadcasts the encoded bits over an allocated physical broadcast channel (PBCH).

12. The device of claim 11, wherein the Polar encoder has a plurality of input bits, wherein each input bit position has an index associated with a channel reliability.

13. The device of claim 11, wherein the set of timing-related bits comprises ten system frame number (SFN) bits and a half radio frame bit that are known to the plurality of receivers under the one or more conditions.

14. The device of claim 13, wherein the set of timing-related bits is mapped to Polar encoder input bit positions having indices 441, 469, 247, 367, 375, 444, 470, 483, 415, 485, and 473 with ascending reliability.

15. The device of claim 13, wherein the transmitter also performs a bit scrambling, a cyclic redundancy check (CRC) attachment, and an interleaving on the plurality of information bits.

16. The device of claim 15, wherein the bit mapping is performed before the bit scrambling on the plurality of information bits.

17. The device of claim 16, where the set of timing-related bits is mapped to the plurality of information bits having the predefined order from position set {16, 23, 18, 17, 8, 30, 10, 6, 24, 7, 0}.

18. The device of claim 11, wherein the plurality of information bits comprises a second set of timing-related bits including a half radio frame bit and three synchronization signal block time index (SSBI) bits.

19. The device of claim 18, wherein the second set of timing-related bits is placed at the Polar encoder input bit positions with the smallest utilized index values having indices 247, 253, 254, and 255.

20. The device of claim 18, wherein a second set of timing-related bits is mapped to the plurality of information bits having positions of {0, 2, 3, 5} before a bit scrambling operation.

* * * * *